Dec. 20, 1960
C. V. MULLEN, JR
2,965,438
TREATMENT OF COPPER AMMONIUM SALT SOLUTION
Filed Jan. 15, 1959
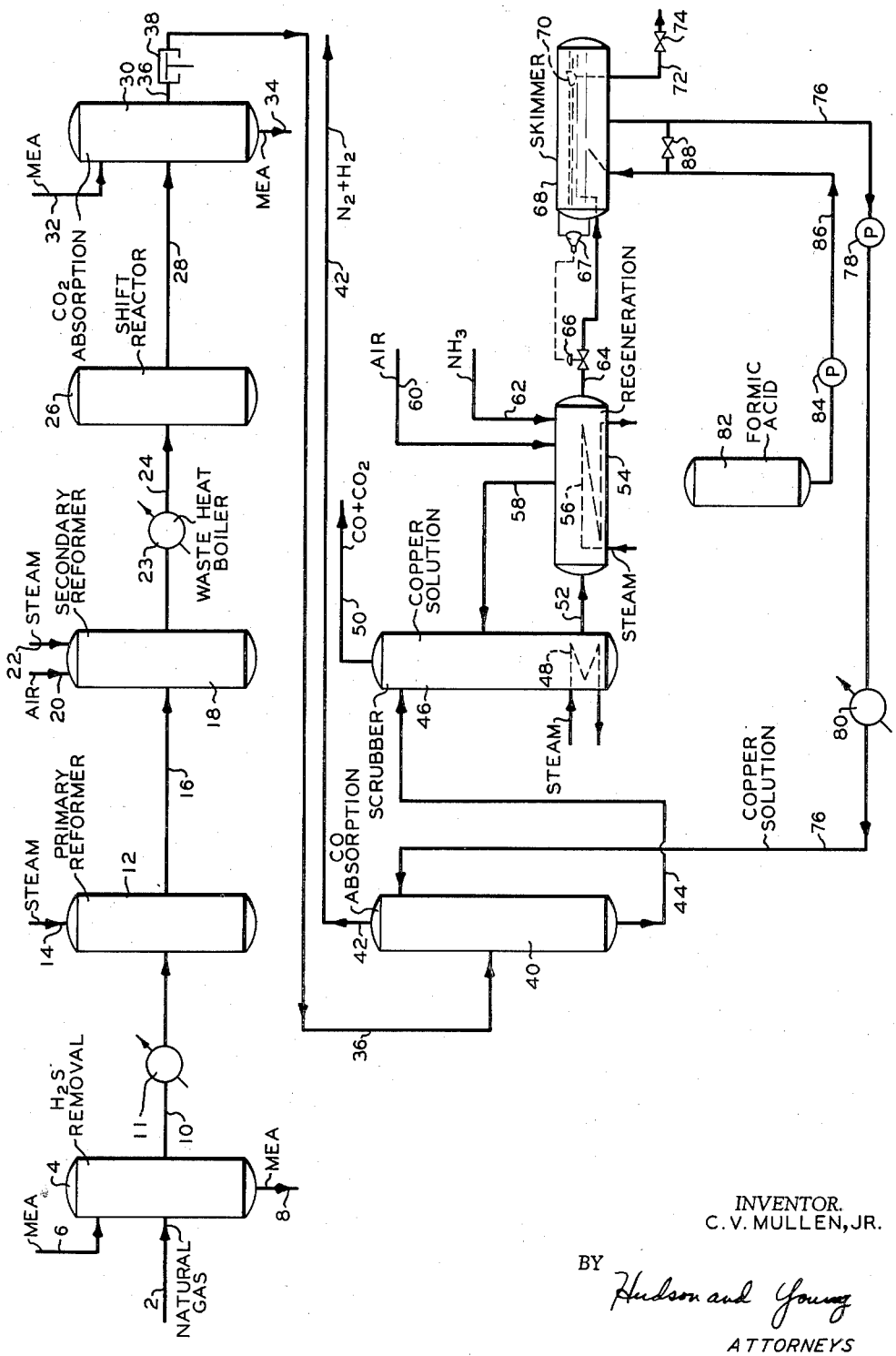
INVENTOR.
C. V. MULLEN, JR.
BY
*Hudson and Young*
ATTORNEYS United States Patent Office 2,965,438
Patented Dec. 20, 1960

2,965,438

TREATMENT OF COPPER AMMONIUM SALT SOLUTION

Charles V. Mullen, Jr., Cactus, Tex., assignor to Phillips Petroleum Company, a corporation of Delaware Filed Jan. 15, 1959, Ser. No. 787,071

13 Claims. (Cl. 23—2)

This invention relates to the purification of ammonia synthesis gas. In one aspect it relates to the removal of carbon oxides from ammonia synthesis gas by treatment with copper ammonium salt solution, and regeneration and fortification of said salt solution.

Purification of ammonia synthesis gas to effect the removal of carbon oxides can be provided by contacting said gas with a copper ammonium salt solution. Following this operation the salt solution is customarily regenerated to remove absorbed carbon oxides, refortified with acid, ammonia copper, etc., as required to maintain its strength, and reused for purification of additional synthesis gas. The removal of the carbon oxides from the synthesis gas is customarily effected at high pressures, up to several hundred atmospheres or higher. In the compression of the synthesis gas to these high pressures, lubricating oil from the compressors often contaminates the gas. This heavy oil, which is immiscible with the salt solution, is scrubbed from the gas along with the carbon oxide and is removed with these oxides in the copper ammonia salt solution. To prevent build up of the lubricating oil in the circulating salt solution, this material is either periodically or continuously separated from the solution, for example, by introducing the solution to a suitable settling zone wherein skimming of the oil can be carried out.

During treatment of the synthesis gas and regeneration of the copper ammonium salt, it becomes necessary to add make-up acid to the system to replace acid which is lost during the processing operations. It has been customary in the past to add the acid to the skimming tank, by pouring the acid into the top of the tank. During this procedure it has been noted that at times the copper concentration in the copper ammonium salt solution is reduced. This is especially true at times when the batches of acid are added to the skimming tank.

It is an object of this invention to provide an improved process for the purification of ammonia synthesis gas.

Another object of the invention is to provide an improved process for the regeneration and fortification of ammoniacal copper salt solution used in the absorption of carbon oxides from ammonia synthesis gas.

Still another object of this invention is to provide an improved process for adding make-up acid to ammoniacal copper salt solution used in the absorption of carbon oxide from ammonia synthesis gas.

Still another object of this invention is to reduce the quantity of make-up copper added to ammoniacal copper salt solution used in the absorption of carbon oxides from ammonia synthesis gas.

These and other objects of the invention will become more readily apparent in the following detailed description and discussion.

The foregoing objects are achieved broadly by introducing copper ammonium salt solution containing heavy oil immiscible therewith to a separation zone wherein said oil is separated from said salt and introducing make-up acid to said solution in a zone of turbulence and low concentration of heavy oil whereby said acid is quickly dispersed in the solution.

In one aspect of the invention the make-up acid is introduced to the copper ammonium salt solution as a high velocity stream of small cross-section.

In another aspect of the invention the heavy oil is separated from the copper ammonium solution by skimming, the skimmed solution is removed from the separation zone by a pump and the make-up acid is introduced to the suction of said pump.

The invention is applicable broadly to the treatment of copper ammonium salt solutions. These solutions find use generally in the absorption of gases and in particular in the absorption of the carbon oxides, carbon monoxide and carbon dioxide. The following discussion is directed to an application of the invention wherein copper ammonium salt solution is utilized to remove carbon oxides from an ammonia synthesis gas. This is not intended, however, in any limiting sense and is within the scope of the invention to treat copper ammonium salt solutions which have been used in any absorption process.

Ammonia synthesis gas is usually prepared by reacting a gaseous hydrocarbon, such as methane, with steam at elevated temperatures. The reaction can be carried out noncatalytically or preferably in the presence of a catalyst, such as, an oxide of nickel or cobalt. In addition to the nickel or cobalt oxide, other compounds can be added to the catalyst to promote the formation of the synthesis gas. The reaction, when catalyzed, is carried out in a temperature range usually of between about 600 and 1000° C. Somewhat higher temperatures are required for the noncatalytic reaction, namely between about 1000 and about 1300° C. The process can be carried out at pressures from as low as a few atmospheres to as high as several hundred atmospheres. The synthesis gas can be formed in a single stage operation or, if desired, two stages can be employed, with partial conversion of methane to carbon monoxide in the first stage and additional conversion of methane and further oxidation of a portion of the carbon monoxide to carbon dioxide in the second stage. While natural gas or methane is the preferred feedstock, other materials can also be employed in preparing the synthesis gas. Thus, in one method heavy hydrocarbon fractions are converted in the presence of oxygen or oxygen enriched air at more elevated temperatures to provide a noncatalytic conversion of the hydrocarbons to a mixture of hydrogen and carbon oxide. Following this operation nitrogen is added to the conversion gases to provide the desired ratio of hydrogen to nitrogen.

The raw synthesis gas contains a substantial quantity of carbon monoxide, and in order to provide additional hydrogen the gas is customarily contacted with a catalyst, such as iron oxide, which promotes the water gas shift reaction. In this reaction added steam reacts with carbon monoxide to form carbon dioxide and hydrogen. The shift reaction is usually carried out in a temperature range of between about 415 and about 440° C. and at substantially the same pressure as the synthesis gas formation. Leaving the water gas shift, the synthesis gas is passed through an absorption step in contact with an absorbent such as caustic or monoethanolamine, wherein the major proportion of carbon dioxide is removed. After this operation the synthesis gas is contacted with a copper ammonium salt solution for removal of the remaining carbon dioxide and carbon monoxide. The salt solutions which can be employed for this purpose include copper salts in general, for example copper ammonium acetate, formate, nitrate, chloride, sulfate, bromide, iodide, etc. Preferred salt solutions are copper ammonium acetate and copper ammonium formate.

The copper solution which is employed in purifying the ammonium synthesis gas is preferably reused, thus it becomes necessary to remove absorbed carbon oxides from this solution. This is effected by introducing the solution containing carbon oxides to a heated vessel wherein release of the oxides takes place. The regenerated copper solution is then available for reuse in purification of the synthesis gas. During the course of the treatment of the synthesis gas and regeneration of the copper solution portions of the copper solution and the various components contained therein are lost from the system. In order to maintain the strength of the copper solution it becomes necessary to either periodically or continuously introduce additional ammonia, copper and make-up acid to the system.

While the formation of the synthesis gas can be effected at low pressures, it is desirable that removal of carbon monoxide from the synthesis gas be effected at very high pressures, usually on the order of several hundred atmospheres. As previously mentioned, when the synthesis gas is compressed to these high pressures, lubricating oil from the compressors contaminates the gas. This oil is scrubbed from the gas along with the carbon monoxide and carbon dioxide and accumulates in the copper ammonium solution. To prevent build-up of oil in the absorption system, a skimming tank is provided whereby the heavy lubricating oil can accumulate, at the surface of the copper solution, and be removed therefrom by skimming.

As previously mentioned, during the course of the operation of removing carbon oxides from the synthesis gas and regenerating the copper solution it becomes necessary to either periodically or continuously introduce ammonia, copper and make-up acid to the system. It has been found that when make-up acid is introduced into the copper solution, precipitation of copper occurs unless the acid is quickly dispersed in the copper liquor. When, with sufficient dispersion of the acid precipitation of copper does occur, redissolving of the copper can be effected with proper dispersion. It has also been found that if the acid is added to the copper solution at a point where heavy oil is concentrated, such as in the skimmer, copper which is precipitated from the solution is occluded in the oil and does not redissolve, even when the formic acid is dispersed in the solution. When the heavy oil is removed from the skimmer and discarded any copper occluded therein constitutes a permanent loss and must be made up by the addition of fresh copper to the solution. It has now been discovered that the problem of copper precipitation from the copper ammonium salt solution and occlusion of copper in the heavy oil can be solved by introducing make-up acid into the copper ammonium salt solution in a zone of turbulence whereby the acid is quickly dispersed in the solution. It has further been found desirable to introduce the make-up acid to a region of the copper ammonium salt solution wherein there is a low concentration of heavy oil and more preferably to a region which is substantially free of said oil.

Various procedures can be employed in introducing the make-up acid, for example, agitation of the copper ammonium solution can be provided and the acid introduced more or less continuously to the agitated zone. In another method of operation the acid is introduced to the copper solution in the form of a plurality of streams of small cross section having a high velocity whereby the acid itself creates the zone of turbulence. In still another method of operation the copper ammonium solution is withdrawn from the skimming zone by a pump and the make-up acid is introduced to the suction of the pump. In general any procedure can be employed whereby the make-up acid is introduced to a zone of turbulence and preferably in a region of low heavy oil concentration.

The amount of make-up acid required varies depending on the particular operation. However, usually it is necessary to add acid at the rate of ten to twenty gallons per day to a plant producing 500 to 600 tons of ammonia per day. While the acid can be added periodically, it is generally preferred that it be added continuously and as a small stream or streams at a high velocity, so as to assure maximum dispersion of the acid in the solution and minimum precipitation of copper therefrom.

In order to more clearly describe the invention and provide a better understanding thereof, reference is had to the accompanying drawing which is a diagrammatic illustration of an ammonia synthesis gas unit and associated equipment for the separation from synthesis gas of carbon oxides and regeneration of copper ammonium salt solution. As indicated in the drawing, natural gas containing principally methane, with small quantities of ethane, propane and butane is introduced through conduit 2 to hydrogen sulfide removal vessel 4. In this vessel the gas is contacted with monoethanolamine introduced through conduit 6, and amine containing hydrogen sulfide is removed through conduit 8. The purified gas feed is then passed through conduit 10 and heater 11 to primary reformer 12 wherein the gas is contacted with nickel oxide catalyst in the presence of steam, introduced to the reformer vessel through conduit 14. The primary reformer is maintained at a temperature of about 700° C. and a pressure of about 35 p.s.i.g. whereby the major proportion of hydrocarbon is converted to carbon monoxide and carbon dioxide. The effluent from the primary reformer is introduced to a secondary reformer 18 through conduit 16 wherein additional reforming is carried out in the presence of air and steam introduced to the reformer through conduits 20 and 22, respectively. The secondary reformer is maintained at a slightly higher temperature, that is about 840° C. In this vessel additional hydrocarbon is converted and a portion of the carbon monoxide present in the entering gas is converted to carbon dioxide. Sufficient air is introduced to the secondary reformer to provide an exit gas having a hydrogen to nitrogen mol ratio of about 3:1. The gases leaving the secondary reformer are cooled by passage through waste heat boiler 23 and are then introduced to shift reactor 26 through conduit 24. Additional steam (not shown) is added to the gas either before or after the waste heat boiler so that the resulting steam-gas mixture contains sufficient steam for the shift reaction. In the shift reactor the gases contact an iron oxide catalyst whereby the major proportion of the carbon monoxide present therein is converted with steam to carbon dioxide and hydrogen. This reaction is carried out at a temperature of about 430° C. and at about the same pressure as the secondary reforming step. Following the shift reaction, the gases are passed through $CO_2$ absorber 30 wherein they are contacted with monoethanolamine for the removal of carbon dioxide. The amine is introduced to tower 30 through conduit 32 and is removed along with absorbed carbon dioxide through conduit 34. The gases leaving tower 30 are passed through conduit 36, compressor system 38, wherein they are increased in pressure to about 5000 pounds/sq. in. gauge, and are then introduced to CO absorption tower 40. In this vessel the gases encounter their final scrubbing, in this instance with copper ammonium formate solution, whereby remaining carbon dioxide and carbon monoxide are removed. The scrubbed gases, now comprising essentially hydrogen and nitrogen, in the mol ratio of about 3:1 are removed overhead from tower 40 through conduit 42 and transferred to the ammonia synthesis plant (not shown). Copper solution containing absorbed carbon monoxide and carbon dioxide is passed through conduit 44 to scrubber 46 when the carbon dioxide and carbon monoxide are released by the application of increased temperature. Heat required for this purpose is provided by steam introduced to reboiler 48 in the bottom of the scrubber and to steam coil 56, which is disposed in vessel 54. Regenerated copper solution passes from the bottom of scrubber 46 through conduit 52 into vessel 54 and gases are returned overhead from vessel 54 through conduit 58. The returned gases pass countercurrently to copper solution introduced through conduit 44, which solution aids in absorbing ammonia released in these gases. As required to make up materials lost from the system, ammonia is introduced to vessel 54 through conduit 62. To prevent precipitation of copper from the copper ammonium formate solution it is necessary that the relative amounts of cuprous and cupric copper in the solution be maintained within a predetermined range. To control this ratio air may be introduced to vessel 54 through conduit 60. Increasing the amount of air increases the quantity of cupric copper present in the solution.

During compression of the synthesis gas, prior to its introduction to the carbon monoxide absorption system, heavy compressor oil is introduced to the flowing gas stream. This material is absorbed by the copper ammonium formate solution along with the carbon monoxide and carbon dioxide, but is not released in regeneration of the copper solution. To effect removal of this heavy oil, which is immiscible with the copper solution, the regenerated solution is passed from vessel 54 through conduit 64 and control valve 66 into skimmer 68. The total flow of material into the skimmer is controlled by liquid level controller 67 which actuates control valve 66. In the skimmer the heavy oil accumulates at the top of the liquid surface and passes into trough 70, being withdrawn from the skimmer through conduit 72 and valve 74. The copper solution, now containing minor amounts of heavy oil, is removed from the skimmer through conduit 76 and pump 78, cooled in cooler 80 and introduced again to absorption vessel 40 wherein it is contacted with synthesis gas which contains carbon monoxide and dioxide. Along with the addition of ammonia to the circulating copper solution, it is also necessary to add copper and formic acid to replace losses from the system. The formic acid, which is obtained from vessel 82, is passed through pump 84 and conduit 86 and introduced into a lower part of skimmer 68 at a point adjacent to the suction of pump 78, i.e. near outlet conduit 76. In this manner the acid is quickly withdrawn from the vessel and evenly dispersed in the circulating copper solution by the turbulent mixing action of the pump 78. The acid is introduced to the suction of the pump in the form of a small stream, and continuously to limit the quantity introduced to a minimum. The portion of the solution to which the acid is introduced, being below the surface level in the skimmer, contains a low concentration of heavy oil. As shown in the drawing the acid can be introduced alternatively through valve 88 and directly into conduit 76.

The preceding discussion has been directed to a preferred embodiment of the invention; however, this is not intended in any limiting sense, and it is within the scope of the invention to employ other apparatus and process arrangements. Thus, for example, while removal of heavy oil by skimming is shown it is also within the scope of the invention to carry out this separation by other methods, such as, for example, by filtration and addition of the make-up acid to the filtrate. It is also within the scope of the invention to provide quick dispersal of acid in the copper ammonium salt solution by introducing the acid at a plurality of high velocity streams of small cross-section whereby turbulence and dispersion are created by the flowing acid and any copper which may precipitate will be redissolved before the copper solution enters absorber 46.

The following data are presented in illustration of the invention:

EXAMPLE 1

About 500 cc. of copper ammonium formate liquor from a commercial plant, containing only a minor amount of oil, was placed in a 1000 cc. beaker and from 10 to 50 cc. of formic acid was added. Following addition of the acid, metallic copper plated out along the sides and bottom of the beaker. The formic acid was added dropwise. Following precipitation of the copper the mixture was transferred to a 5000 cc. beaker and 1000 cc. of plant copper liquor was added and stirred into the 500 cc. mixtures. Dilution of the sample with the fresh copper liquor caused the precipitated copper to redissolve.

The same test was repeated using a plant copper liquor having a top layer of oil from ¼ to ½ inch thick. In this test the formic acid was dropped onto the surface of the oil. Copper precipitated from the solution and was occluded in the oil and the oily layer, which originally floated on the surface of the copper liquor, became heavy and sank to the bottom of the beaker. By measurement the total copper in the aqueous portion of the copper liquor dropped from 10.2 grams/100 ml. to 4.2 g./100 ml. When an additional 1000 cc. of copper liquor was added to the original sample the copper did not redissolve as in the previous test.

EXAMPLE 2

Both of the above tests were repeated and in addition the equivalent of about 10 cc. of anhydrous liquid ammonia was added in the vapor state along with addition of the formic acid. In the first test of this example without oil on the surface of the liquid the formic acid was added underneath the surface drop-wise and any copper precipitated was redissolved upon dispersion of the acid. In repeating the second test with the oil layer on top of the liquor the formic acid was added to the surface of the liquid and passed through the oil layer. In this case precipitated copper was occluded in the oil and did not redissolve.

EXAMPLE 3

In the first test of this example, 500 cc. of plant copper liquor was placed in a 1000 cc. beaker and 25 cc. of formic acid was added drop-wise underneath the surface of the liquid. Copper precipitated from the solution. The solution was poured off the copper precipitate and about 1000 cc. of copper plant liquor was stirred and heated with the precipitated copper in a 5000 cc. beaker. The precipitated copper went into solution.

The above test was substantially duplicated except that the equivalent amount of acid was dumped into the surface of the plant copper liquor. Substantially the same thing happened as in the previous test except that the reaction occurred much faster and some of the solution was thrown out of the beaker by the violence of the boiling in the solution. Again in this test addition of fresh plant liquor caused the precipitated copper to dissolve.

An additional test was carried out wherein acid was dumped onto the surface of copper liquor containing a layer of oil about ¼ to ½ inch thick. In this instance copper was precipitated, being occluded in the oil, and the entire mass of copper and oil dropped to the bottom of the beaker. The addition of fresh liquor did not result in dissolving the copper.

It can be concluded from the above examples, I to III, that relatively high concentrations of formic acid in copper ammonium salt solution at any location will cause copper to leave the solution. If the acid is added in a region where the precipitated copper comes into contact with oil, occlusion of the copper solids in the oil results. If, on the other hand, the acid is added at a location where there is no appreciable amount of oil, the copper solids will, upon dispersion, be returned to solution. Also, if the acid is suitably dispersed when added, no precipitation of copper will occur.

The following example is presented in illustration of an embodiment of the invention on a commercial scale.

Flows

SYNTHESIS GAS

| | |
|---|---|
| Feed to absorber (36), cu. ft./hr. | 2,365,000 |
| Composition: | |
|     Nitrogen _____vol. percent__ | 23.9 |
|     Hydrogen _____do____ | 71.1 |
|     Carbon monoxide _____do____ | 3.6 |
|     Inerts _____do____ | 0.9 |
|     Carbon dioxide _____do____ | 0.5 |
|     Heavy oil _____p.p.m.__ | 5 |
| Copper solution to absorber (76) _____g.p.m__ | 480 |
| Feed to scrubber (44) _____g.p.m__ | 480 |
| Composition: | |
|     Copper solution _____vol. percent__ | 99.1 |
|     Carbon monoxide _____do____ | 0.5 |
|     Carbon dioxide _____do____ | 0.2 |
|     Heavy oil _____do____ | 0.2 |
| Feed to skimmer (64) _____g.p.m__ | 480 |
| Composition: | |
|     Copper solution _____vol. percent__ | 99.8 |
|     Heavy oil _____do____ | 0.2 |
| Formic acid to skimmer (86) _____g.p.h__ | 0.5 |

Temperatures

| | °F. |
|---|---|
| Absorber (40): | |
|     Top | 40 |
|     Bottom | 46 |
| Scrubber (46): | |
|     Top | 68 |
|     Bottom | 172 |
| Skimmer (68) | 80 |

Pressures

| | P.s.i.g. |
|---|---|
| Absorber (40) | 1850 |
| Scrubber (46) | 12 |
| Skimmer (68) | 0 |

In the above operation which was carried out in apparatus similar to that shown in the drawing formic acid was introduced to the skimmer near the outlet nozzle through four 1/16 inch diameter stainless steel pipes so as to provide a continuous addition of formic acid in an amount set forth above. Addition of the formic acid in this manner substantially prevented occlusion of and loss of copper in the heavy oil skimmed from the copper ammonium salt solution.

Having thus described the invention by providing specific examples thereof it is to be understood that no undue limitations or restrictions are to be drawn by reason thereof and that many variations and modifications are within the scope of the invention.

I claim:

1. In a process for the treatment of copper ammonium salt solution containing a heavy oil immiscible therewith, in which said oil is separated from said solution in a separation zone and make-up acid is added to said solution to fortify said solution, the improvement which comprises introducing acid into said solution in a zone of turbulence in the substantial absence of heavy oil, the acid thus being quickly dispersed in said solution.

2. The process of claim 1 in which the copper ammonium salt is copper ammonium formate.

3. The process of claim 1 in which the copper ammonium salt is copper ammonium acetate.

4. In a process for the treatment of copper ammonium salt solution containing a heavy oil immiscible therewith in which said oil is separated from the surface of said solution in a skimming zone and make-up acid is added to said solution to fortify said solution, the improvement which comprises introducing acid into the copper ammonium salt solution in the skimming zone, below the oil level therein, in a zone of turbulence, whereby the acid is quickly dispersed in said solution without precipitation of copper from solution.

5. The process of claim 4 in which the skimmed solution is withdrawn from the skimming zone through a pump and the acid is introduced to said solution in the suction of said pump.

6. The process of claim 4 in which the copper ammonium salt is copper ammonium formate.

7. The process of claim 4 in which the copper ammonium salt is copper ammonium acetate.

8. In a process for the treatment of copper ammonium formate solution containing lubricating oil immiscible therewith, in which said oil is separated from the surface of said salt solution in a skimming zone and make-up formic acid is added to said solution to fortify said solution, the improvement which comprises withdrawing skimmed solution from said skimming zone through a pump and continuously introducing formic acid into said solution in the suction inlet of said pump, whereby said acid is quickly dispersed in said solution without precipitation of copper from solution.

9. In a process for the removal of carbon oxides from ammonia synthesis gas containing entrained heavy oil, in which said gas is contacted with a solution of a copper ammonium salt with which said oil is immiscible whereby the carbon oxides are absorbed and removed from the synthesis gas, the entrained oil also being removed by said solution, the solution containing carbon oxides and heavy oil is passed through scrubbing and regeneration treatments wherein absorbed carbon oxides are released and the salt is regenerated, the regenerated solution is passed to a separation zone wherein heavy oil is separated and acid is introduced to the regenerated solution to replace acid loss from the system, the improvement which comprises introducing acid into said solution, in a zone of turbulence, in the substantial absence of heavy oil, the acid thus being quickly dispersed in said solution without precipitation of copper from solution.

10. The process of claim 9 in which the copper ammonium salt is copper ammonium formate.

11. The process of claim 9 in which the copper ammonium salt is copper ammonium acetate.

12. The process of claim 10 in which formic acid is introduced to the copper ammonium salt solution continuously in the form of a high velocity stream of small cross-section.

13. A process according to claim 9 wherein said heavy oil is a compressor lubricating oil introduced into said synthesis gas during compression thereof.

References Cited in the file of this patent

UNITED STATES PATENTS

| 2,557,682 | Packie | June 19, 1951 |
| 2,824,886 | Barry et al. | Feb. 25, 1958 |